(12) United States Patent
Weiss et al.

(10) Patent No.: US 8,244,427 B2
(45) Date of Patent: Aug. 14, 2012

(54) MODULAR TEMPERATURE PERFORMANCE DIAGNOSTIC FOR A VEHICLE

(75) Inventors: Robert Weiss, Clinton Township, MI (US); Thomas E Mathews, Pendleton, IN (US); Andrew M. Zettel, Ann Arbor, MI (US); Wei D. Wang, Troy, MI (US)

(73) Assignees: GM Global Technology Operations LLC, Detroit, MI (US); Hewlett-Packard Development, L.P., Fort Collins, CO (US)

( * ) Notice: Subject to any disclaimer, the term of this patent is extended or adjusted under 35 U.S.C. 154(b) by 277 days.

(21) Appl. No.: 12/785,696

(22) Filed: May 24, 2010

(65) Prior Publication Data

US 2011/0288723 A1 Nov. 24, 2011

(51) Int. Cl.
*G06F 11/00* (2006.01)
(52) U.S. Cl. ............ 701/29.7; 701/30.3; 701/30.7; 702/99; 702/104; 702/116; 702/130
(58) Field of Classification Search .......... 701/22, 701/29.1, 29.7–29.9, 30.1–30.3, 30.5–30.9, 701/31.3, 33.7, 33.9; 702/57–59, 99, 104, 702/116, 130
See application file for complete search history.

(56) References Cited

U.S. PATENT DOCUMENTS

| | | | | |
|---|---|---|---|---|
| 5,848,381 A | * | 12/1998 | Ishii et al. | 702/99 |
| 5,995,887 A | * | 11/1999 | Hathaway et al. | 701/30.1 |
| 7,445,383 B2 | * | 11/2008 | Huttenlocher et al. | 374/137 |
| 7,555,411 B2 | * | 6/2009 | Wang et al. | 702/188 |

* cited by examiner

*Primary Examiner* — Ruth Ilan
(74) *Attorney, Agent, or Firm* — Quinn Law Group, PLLC

(57) ABSTRACT

A vehicle includes a power inverter module (PIM), a motor/generator unit (MGU), vehicle components, temperature sensors, and a controller. The sensors measure temperatures of a motor winding of the MGU, and temperatures of the multiple phase outputs of the PIM. The second plurality of temperature sensors measures temperatures of the vehicle components. The controller calculates an average temperature of the components, and individually diagnoses each temperature sensor using the average temperature. A control circuit for the vehicle includes the first and second plurality of sensors and the controller. A temperature performance diagnostic method includes using the first plurality to measure a temperature of the motor winding and the phase outputs of the PIM, using the second plurality to measure a temperature of the components, calculating an average temperature of the components, and individually diagnosing the performance of each of the first plurality of sensors using the average temperature.

16 Claims, 1 Drawing Sheet

MODULAR TEMPERATURE PERFORMANCE DIAGNOSTIC FOR A VEHICLE

TECHNICAL FIELD

The present invention relates to automated approaches for determining temperature-related characteristics or performance of a vehicle electrical component.

BACKGROUND

Vehicles are comprised of a host of independent and interdependent systems. Primary and secondary controllers process various signals transmitted by physical sensors to determine the proper functioning of the sensors and related onboard systems. A common cost reduction technique is the replacement of some of the physical sensors with virtual sensors, i.e., software-based estimators or inferred logic values. Virtual sensors may reduce the cost and packaging associated with each physical sensor that is replaced, along with its associated harness, as well as the required sensor diagnostics for the replaced sensor. However, software-based estimators may be less than optimal under certain conditions, e.g., during a sensor redesign or for certain types of high-voltage electrical motor sensors.

In a typical hybrid vehicle, diagnostic logic is hardcoded such that every high-voltage power inverter and electric motor combination requires three different phase inverter temperature sensors, which are typically configured as thermistors, and a motor winding thermistor. The diagnostic logic ordinarily must be reprogrammed whenever one of the thermistors is eliminated. As a result, conventional temperature diagnostic logic cannot adequately diagnose more than one severely drifted thermistor.

SUMMARY

Accordingly, a flexible and modular temperature diagnostic performance algorithm is provided herein for use aboard a vehicle. The algorithm automatically diagnoses the temperature performance of thermistors or other temperature sensors used in conjunction with certain high-voltage electrical components aboard the vehicle. As used herein, the term "diagnose" means to analyze the temperature readings from the sensors to thereby evaluate whether the sensor is properly functioning or operating. The algorithm is modular. That is, the algorithm can properly function under any combination of inverter phase and motor phase winding temperature sensors, with the particular sensor arrangement predefined, e.g., using "sensor present" variables. Moreover, by simply ignoring any temperature sensors that are not present, the algorithm eliminates the need to reprogram the temperature performance diagnostic logic for every sensor change.

The algorithm is executable by a motor control processor (MCP) or other designated onboard controller to automatically compare temperature readings from each present inverter phase and motor winding temperature sensor to a calculated average temperature of designated vehicle components, e.g., an average temperature of a high-voltage power electronics cooling loop thermistor and a transmission thermistor in one particular embodiment. Using an average of temperatures taken from two different parts of the vehicle powertrain may help to minimize the skewing effects of any local temperature differences in the calculated average.

In particular, a vehicle is provided herein that includes a power inverter module (PIM), an electric motor/generator unit (MGU) that is electrically connected to the PIM and that has a motor winding, and a pair of vehicle components, e.g., a transmission sump or another suitable portion of a transmission and a power electronics cooling loop adapted for cooling the PIM and/or other high-voltage electronics aboard the vehicle. A first plurality of temperature sensors measures a temperature of the motor winding and of different corresponding phase outputs of the PIM. A second plurality of temperature sensors measures a temperature of the vehicle components. An MCP or other designated controller has an algorithm providing a temperature performance diagnostic, with the algorithm calculating an average temperature of the vehicle components, and individually diagnosing the performance of each of the first plurality of temperature sensors using the calculated average temperature. The first and second temperature sensors may be configured as thermistors in one embodiment as set forth herein.

A control circuit is also provided for use aboard the vehicle noted above. The circuit includes the first and second plurality of temperature sensors. One of the first plurality of temperature sensors measures a temperature of the motor winding, and each of the remaining sensors of the first plurality measures a temperature of a different corresponding phase output of the PIM. The second plurality of temperature sensors measures a temperature of a corresponding one of the pair of additional vehicle components. An MCP or other designated vehicle controller has an algorithm providing a temperature performance diagnostic, with the algorithm calculating an average temperature of the additional vehicle components, and diagnosing the performance of the first plurality of temperature sensors using the average temperature.

A temperature diagnostic method is also provided for use aboard the vehicle. The method may be embodied as an algorithm and executed by the MCP or other controller as noted above. The method includes using the first plurality of temperature sensors to measure a temperature of the motor winding and of the different corresponding phase outputs of the PIM, and using a second plurality of temperature sensors to measure a temperature of the vehicle components. The method further includes calculating an average temperature of the vehicle components, and individually diagnosing the performance of each of the first plurality of temperature sensors using the average temperature.

The above features and advantages and other features and advantages of the present invention are readily apparent from the following detailed description of the best modes for carrying out the invention when taken in connection with the accompanying drawings.

DETAILED DESCRIPTION

Figure 1:
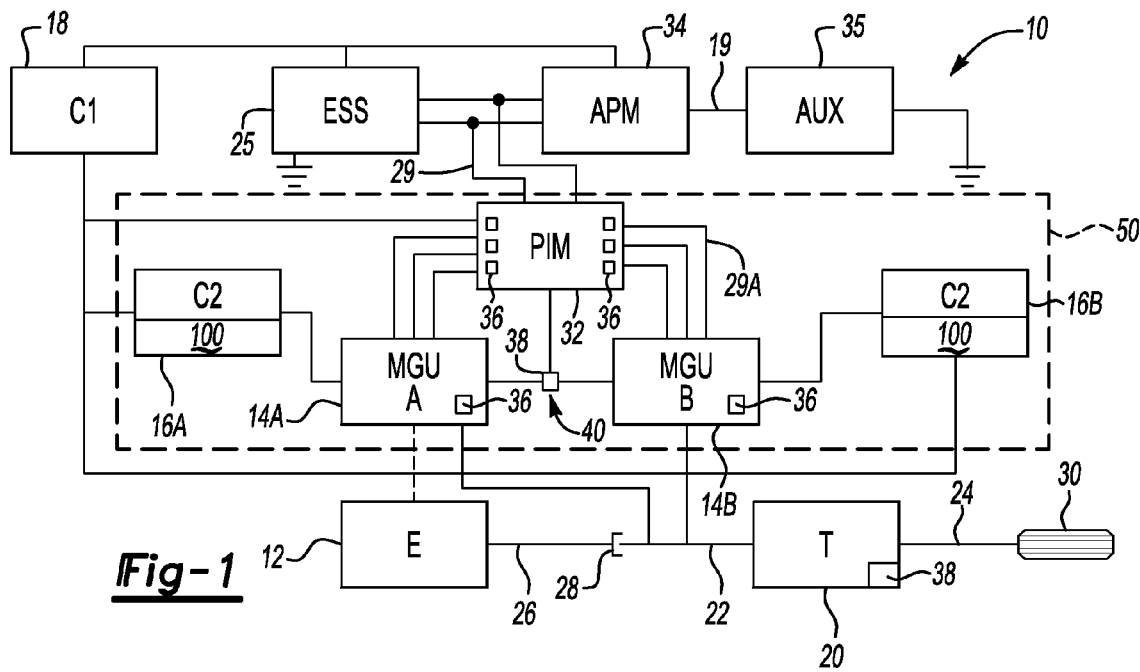
FIG. 1 is a schematic illustration of a vehicle having a temperature performance diagnostic algorithm in accordance with the present invention.

Referring to the drawings, wherein like reference numbers correspond to like or similar components throughout the several figures, a vehicle 10 is shown in FIG. 1 having a temperature performance diagnostic algorithm 100. The vehicle 10 may be configured as any vehicle having one or more electric motor/generator units (MGU) and a three-phase power inverter as explained below, e.g., a hybrid electric vehicle (HEV), a plug-in HEV (PHEV), a battery electric vehicle (BEV), an extended-range HEV (EREV), etc.

In one embodiment, the vehicle 10 may include an internal combustion engine 12 and respective first and second MGUs, i.e., MGU 14A and 14B. Depending on the vehicle configuration, one of the MGUs, for example MGU 14A, may be used to selectively crank and start engine 12 as part of a belt alternator-starter or BAS system, while the second MGU 14B can be used to assist the engine in propelling the vehicle 10, or to propel the vehicle when the engine is off to thereby provide an electric-only (EV) operating mode. Other single or multi-MGU configurations of the vehicle 10 are possible without departing from the intended scope, including EV configurations that do not require an engine.

Controllers 16A, 16B are electrically connected to the MGUs 14A and 14B, respectively, and are programmed to control the functionality of the corresponding MGU. Each controller 16A may also be programmed with or provided access to algorithm 100, the execution of which provides a temperature performance diagnostic tool as described below. In one embodiment, controllers 16A, 16B are dependent secondary controllers (C2), e.g., motor control processors (MCP) rather than high-level or primary controller (C1) 18, e.g., a hybrid control processor (HCP) as understood in the art, although the algorithm 100 may be executed or values stored by other controllers aboard the vehicle 10 if so desired. Controllers 16A, 16B are in communication with the controller 18, and may be adapted to transmit diagnostic information or test results to the controller 18 for generation of a diagnostic code as set forth below.

Vehicle 10 further includes a transmission 20 having an input member 22 and an output member 24. A driveshaft 26 of engine 12 may be selectively connected to input member 22 via a clutch 28. Transmission 20 may be configured as an electrically-variable transmission (EVT) or any other suitable transmission capable of transmitting torque to drive wheels 30 via the output member 24.

Still referring to FIG. 1, each MGU 14A, 14B may be configured as multi-phase electric machines rated for approximately 60 VAC to approximately 300 VAC or more depending on the required design. Each MGU 14A, 14B may be electrically connected to a high-voltage energy storage system (ESS) 25 via a high-voltage direct current (DC) power bus 29, a power inverter module (PIM) 32 having multiple phase outputs connecting to the MGUs 14A, 14B as shown, and a high-voltage alternating current (AC) power bus 29A. The ESS 25 may be selectively recharged, for example by capturing energy via the MGU 14B during a regenerative braking event.

The vehicle 10 may further include an auxiliary power module (APM) 34, e.g., a DC-DC power converter, which is electrically connected to the ESS 25 via the DC power bus 29. The APM 34 may also be electrically connected to an auxiliary battery (AUX) 35, e.g., a 12-volt DC battery, via a low-voltage power bus 19, and adapted for energizing one or more auxiliary systems aboard the vehicle 10, as is well understood in the art.

Controllers 16A, 16B may be integrated into a single vehicle control device or configured as a distributed vehicle control device in electrical communication with each of the MGUs 14A, 14B. Control connections may include any required transfer conductors, e.g., a hard-wired or wireless control link(s) or path(s) suitable for transmitting and receiving the necessary electrical control signals for proper power flow control and coordination aboard the vehicle 10. The controllers 16A, 16B may include such control modules and capabilities as might be necessary to execute all required diagnostic functionality aboard the vehicle 10.

Controllers 16A, 16B, and 18 may be configured as a digital computer having a microprocessor or central processing unit, read only memory (ROM), random access memory (RAM), electrically-erasable programmable read only memory (EEPROM), high speed clock, analog-to-digital (A/D) and digital-to-analog (D/A) circuitry, and input/output circuitry and devices (I/O), as well as appropriate signal conditioning and buffer circuitry. Any algorithms resident in the designated controllers 16A, 16B, including the algorithm 100 as described below with reference to FIG. 2, can be stored in ROM and automatically executed by the controller to provide the respective functionality.

Still referring to FIG. 1, the vehicle 10 includes a control circuit 50, which in addition to the MGUs 14A, 14B and PIM 32, is comprised of the controllers 16A and/or 16B, a first set of temperature sensors, referred to hereinafter as internal temperature sensors 36, and a second set of temperature sensors, referred to hereinafter as external temperature sensors 38. As used herein, the term "internal" refers to the internal position of a given sensor with respect to certain designated electrical components aboard vehicle 10, with the sensors 36 each adapted for measuring or determining, either directly or indirectly, a temperature of the associated electrical component.

In one embodiment, the internal temperature sensors 36 are thermistors, i.e., temperature-variable resistors usually constructed of ceramic or polymer materials. As will be well understood by those of ordinary skill in the art, thermistors are non-linear semi-conductive devices configured to determine a temperature of an associated device based on a changing resistance value. The thermistors used as sensors 36 may be, in one possible embodiment, positive-temperature coefficient (PTC)-type thermistors, although the sensors can also be configured as thermostats, resistance temperature detectors (RTDs), thermocouple devices, or other temperature sensing devices.

Internal temperature sensors 36 may be electrically connected with the end turns or windings of each MGU, e.g., the MGU 14A and/or MGU 14B in the embodiment shown in FIG. 1, as well as within each power inverter used aboard the vehicle 10. For example, the PIM 32 may include three internal temperature sensors 36, i.e., one per phase transmitted via the AC power bus 29A. The sensors 36 are shown in simplified schematic form as single boxes, although the actual number and placement of the sensors may vary.

The external temperature sensors 38 may be likewise configured as PTC-type thermistors or any other suitable temperature-sensing device. The term "external" as used herein refers to the relative placement of the sensors 38 with respect to the particular electrical components being diagnosed. The external temperature sensors 38 should be placed at sufficiently different locations within the powertrain of vehicle 10, such that an average reading taken from the various external locations will minimize the effect of local temperature differences on any calculated values.

In one embodiment, the sensors 38 may be placed within a power electronics cooling loop 40, within the transmission 20, e.g., within a fluid sump, or at other suitable locations. While shown schematically in FIG. 1 for simplicity, those of ordinary skill in the art will recognize that the cooling loop 40, like any cooling loop adapted for cooling high-voltage electronics, may be configured as a pump-driven coolant loop adapted for alternately absorbing and radiating heat generated by the various high-voltage electronics aboard vehicle 10.

Figure 2:
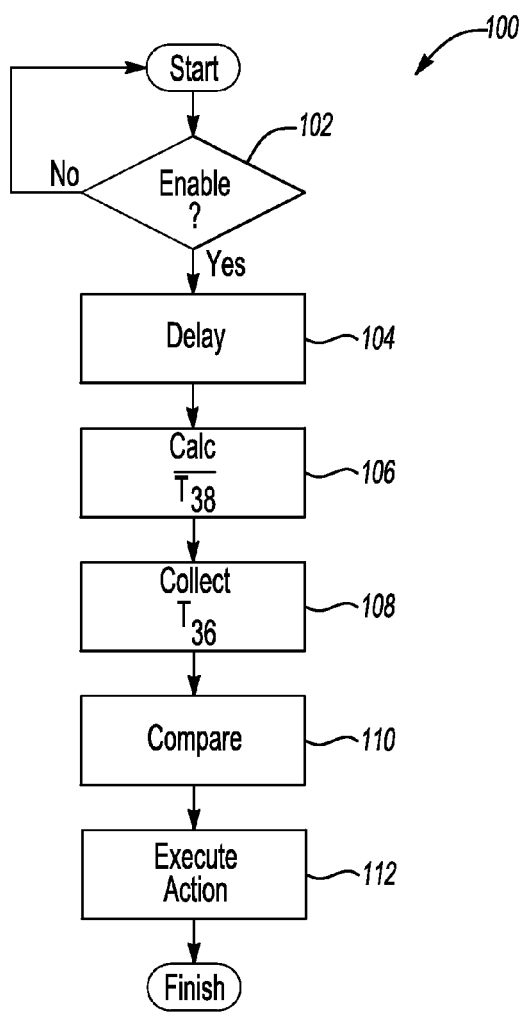
FIG. 2 is a flow chart describing the temperature performance diagnostic algorithm usable with the vehicle shown in FIG. 1.

Referring to FIG. 2, algorithm 100 begins at step 102, wherein a set of enable conditions are initially checked via the designated controller(s), e.g., controllers 16A and/or 16B, to determine whether execution of the algorithm is required. If execution is not required, then the algorithm 100 repeats step 102 in a loop until the enable requirements are properly satisfied, at which point the algorithm proceeds to step 104.

For compliance purposes, step 102 may optionally increment a denominator value to track a total count of the number of times the algorithm 100 could have been executed. The denominator value may then be used with a numerator value to calculate an in-use ratio as explained below with reference to step 104. Possible enablement conditions may include, but are not limited to, a threshold minimum temperature for running the algorithm 100 to completion, a minimum off-time of the propulsion components of vehicle 10, an absence of thermistor range faults, etc.

At step 104, having determined at step 102 that the enablement conditions are satisfied, a calibrated startup delay may be executed, for example by initiating a digital timer. The delay may allow sufficient time to elapse for the completion of range checks of the internal temperature sensors 36, e.g., resistance range checks when the sensors 36 are configured as thermistors. When the calibrated elapsed time has passed, the algorithm 100 proceeds to step 106.

Step 104 may optionally include incrementing a numerator value for the compliance determination noted above. For example, the numerator value can record how often the algorithm 100 actually ran versus how often it could have run, i.e., the denominator value noted above in step 102, to establish the in-use ratio, such as a ratio of 0.336 as required for compliance in certain jurisdictions.

At step 106, temperature measurements are collected from the remote temperature sensors 38, and an average temperature value ($\overline{T_{38}}$) is calculated using these values. The algorithm 100 then temporarily records the average in memory and proceeds to step 108.

At step 108, temperature measurements are collected from each of the internal temperature sensors 36, with these readings represented generally as $T_{36}$ in FIG. 2. Any sensors that are not present, either by reason of malfunction, redesign, maintenance, or otherwise, are simply ignored. Step 108 may include setting a corresponding "sensor present" flag to 1 when a sensor reading is present, and to 0 otherwise. The algorithm 100 proceeds to step 110 when collection of readings $T_{36}$ is complete.

At step 110, each of the readings $T_{36}$ is compared to the average temperature value ($\overline{T_{38}}$) determined at step 106. A localized pass/fail determination is made at step 110, and the result temporarily stored in memory. The algorithm 100 then proceeds to step 112.

Even if the diagnostic fails on the present loop, a diagnostic code may not be set immediately. Instead, a separate routine may be executed to make the diagnostic pass/fail decision. A calibrated X-count (i.e., a fail count) and Y-count (i.e., a sample count) threshold are referenced. The diagnostic may be set such that it must fail X times before Y samples have accrued in order to generate a "diagnostic fail" result. That is, as soon as X fail samples have accumulated, the test will fail, provisionally, but the logic will not formally declare the result until Y sample counts have accumulated.

On each loop, it is determined whether a corresponding sample count (Y), a fail count (X), both, or neither should increment for each internal temperature sensor 36. Then, the logic increments the necessary counters and makes a formal diagnostic pass, fail, or undetermined decision. The algorithm 100 then proceeds to step 112.

At step 112, an action may be taken based on the result of step 110. For example, if a fail decision is formally made, the designated controller, e.g., controller 16A or 16B, may tell the controller 18 to set a diagnostic code via a serial peripheral interface or SPI message or other suitable means before any subsequent default action is executed. Suitable sensor maintenance steps may then be performed as needed to correct the failing result.

Execution of algorithm 100 as set forth above may provide certain performance-related benefits relative to conventional temperature diagnostic methods. For example, typical hybrid vehicle diagnostics are closed systems that rely on the presence of all three inverter phase thermistors, as well as the presence of the motor winding thermistor. In such conventional systems, all thermistors provide temperature values that are compared to a calibrated reference temperature, with the absolute difference between the individual thermistor and the reference temperature calculated and compared to a calibrated delta value. Pass/fail is determined based on this delta comparison alone. Values from each of the temperature sensors in the circuit, whether properly functioning or not, are each considered as part of the temperature average, and therefore complex comparison logic is required to determine if the average is skewed. Resultant limits are placed on the number of failed or drifted sensors.

Also, as noted above, all three inverter sensors and the motor winding thermistor must be present in conventional diagnostic systems. By comparison, algorithm 100 of FIG. 2 will not become invalid if more than one inverter sensor is stuck in range, and the need for complex comparison logic noted above is avoided entirely. Moreover, algorithm 100 can be used for any configuration of inverter and motor winding sensors. As noted above, a secondary controller such as controllers 16A or 16B may host the calculation and storage functions, unlike conventional methods which transmit calculated values to the primary controller, e.g., an HCP, via SPI for storage in the HCP. Therefore, HCP utilization and SPI bandwidth may be optimized using the present approach.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a power inverter module (PIM) having multiple phase outputs;
a motor/generator unit (MGU) electrically connected to the PIM, and having a motor winding;
a pair of vehicle components;
a first plurality of temperature sensors, wherein one of the first plurality of temperature sensors measures a temperature of the motor winding, and wherein each of the remaining sensors of the first plurality of temperature sensors measures a temperature of a corresponding one of the multiple phase outputs of the PIM;
a second plurality of temperature sensors that measure a temperature of a corresponding one of the pair of vehicle components; and
a controller having a temperature performance diagnostic algorithm, wherein the algorithm calculates an average temperature of the pair of vehicle components, and individually diagnoses the performance of each of the first plurality of temperature sensors using the average temperature.

2. The vehicle of claim 1, further comprising a transmission and an electronics cooling loop for cooling the PIM, wherein the pair of vehicle components includes at least one of the transmission and the cooling loop.

3. The vehicle of claim 2, wherein the pair of vehicle components includes each of the transmission and the electronics cooling loop.

4. The vehicle of claim 1, wherein at least some of the first and the second plurality of temperature sensors are positive-temperature coefficient thermistors.

5. The vehicle of claim 1, wherein the controller is a motor control processor which is electrically connected to the MGU.

6. The vehicle of claim 5, wherein the algorithm individually diagnoses each of the first plurality of temperature sensors using the average temperature by individually comparing measurements from each of the first plurality of temperature sensors to the average temperature.

7. A control circuit for use aboard a vehicle having a three-phase power inverter module (PIM), a motor/generator unit (MGU) electrically connected to the PIM and having a motor winding, and a pair of vehicle components, the control circuit comprising:
  a first plurality of temperature sensors, wherein one of the first plurality of temperature sensors is configured to measure a temperature of the motor winding, and wherein each of the remaining sensors of the first plurality of temperature sensors is adapted to measure a temperature of a different corresponding phase output of the PIM;
  a second plurality of temperature sensors each adapted for measuring a temperature of a corresponding one of the pair of vehicle components; and
  a controller having a temperature performance diagnostic algorithm, wherein the algorithm calculates an average temperature of the pair of vehicle components, and individually diagnoses the performance of each of the first plurality of temperature sensors using the average temperature.

8. The control circuit of claim 7, wherein the pair of vehicle components includes each of a transmission and an electronics cooling loop for cooling the PIM.

9. The control circuit of claim 7, wherein at least some of the first and the second plurality of temperature sensors are thermistors.

10. The control circuit of claim 8, wherein the controller is a motor control processor which is electrically connected to the MGU.

11. The control circuit of claim 7, wherein the algorithm individually diagnoses the performance of each of the first plurality of temperature sensors using the average temperature by individually comparing measurements from each of the plurality of temperature sensors to the average temperature.

12. A temperature performance diagnostic method for use aboard a vehicle having a three-phase power inverter module (PIM), a motor/generator unit (MGU) electrically connected to the PIM and having a motor winding, and a pair of vehicle components, the method comprising:
  using a first plurality of temperature sensors to measure a temperature of the motor winding and a temperature of a different corresponding phase output of the PIM;
  using a second plurality of temperature sensors to measure a temperature of a corresponding one of the pair of vehicle components;
  calculating an average temperature of the pair of additional vehicle components; and
  individually diagnosing the performance of each of the first plurality of temperature sensors using the average temperature.

13. The method of claim 12, wherein at least some of the first and the second plurality of temperature sensors are thermistors.

14. The method of claim 12, the vehicle further including a transmission and an electronics cooling loop for cooling the PIM, wherein calculating an average temperature of the pair of vehicle components including calculating an average temperature of the transmission and the electronics cooling loop.

15. The method of claim 12, wherein individually diagnosing the performance of each of the first plurality of temperature includes comparing measurements from each of the plurality of temperature sensors to the average temperature.

16. The method of claim 12, wherein the vehicle includes a motor control processor (MCP) adapted for controlling the MGU and executing the method, and a hybrid control processor (HCP) in communication with the MCP, the method further comprising:
  transmitting a diagnostic pass/fail result from the MCP to the HCP, and using the HCP to generate and record a diagnostic code.

* * * * *